United States Patent Office 2,943,199
Patented June 28, 1960

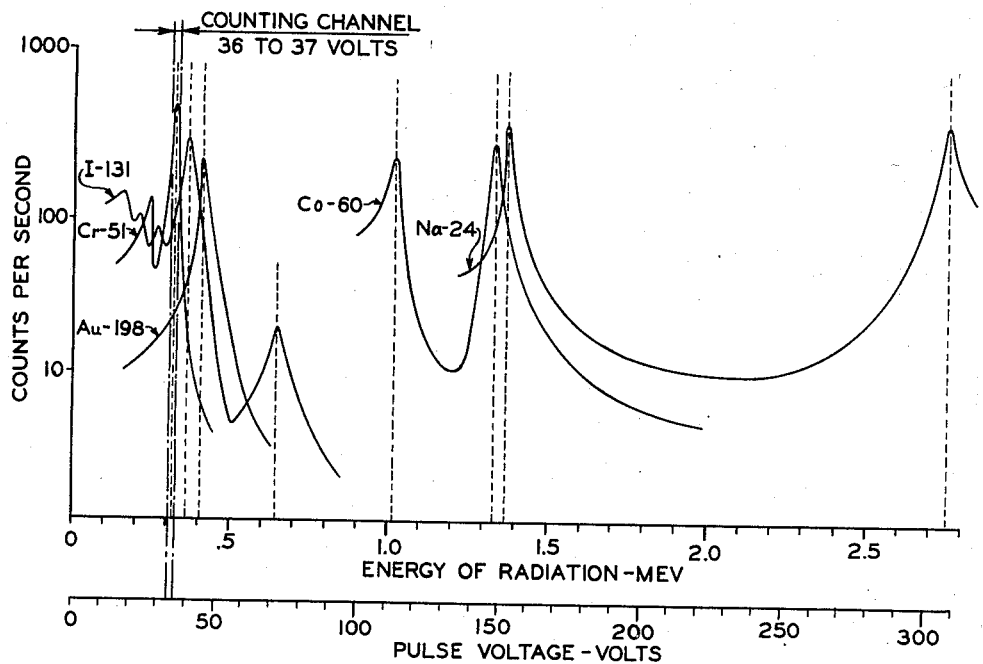
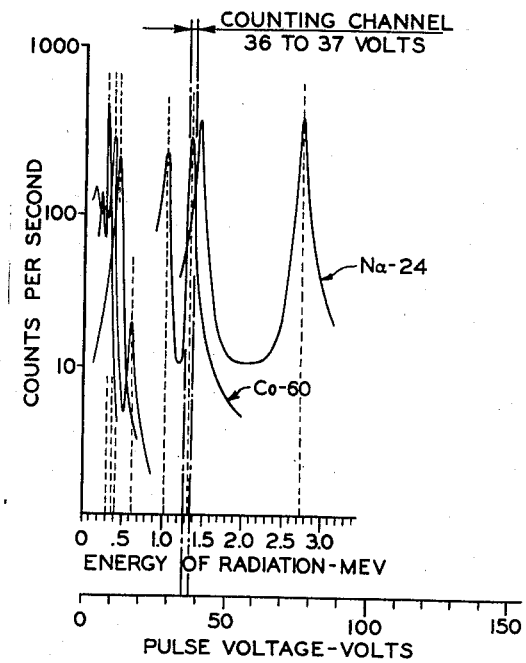

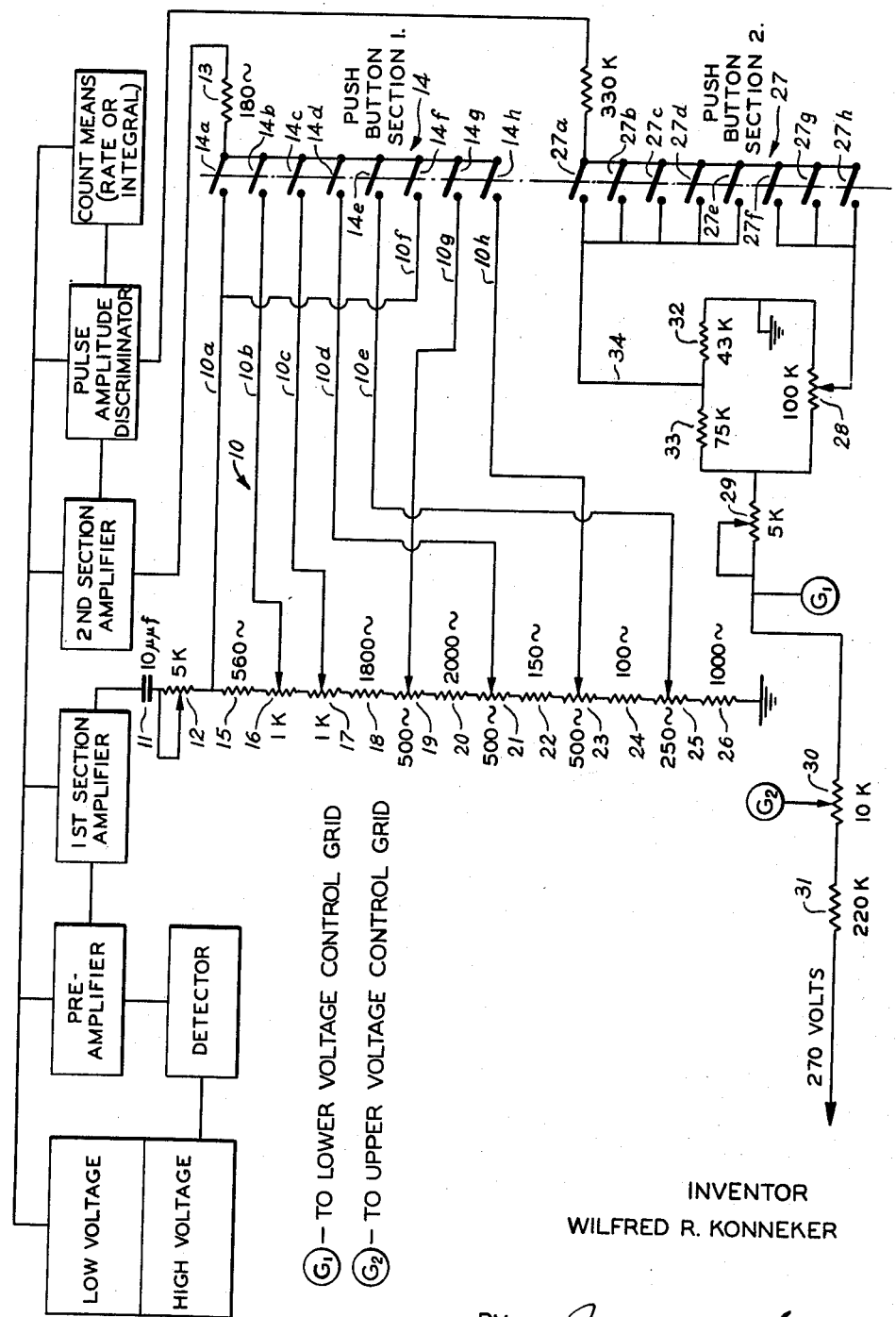

2,943,199
FIXED-CHANNEL SPECTROMETER FOR RADIOACTIVITY

Wilfred R. Konneker, Rock Hill, Mo., assignor, by mesne assignments, to Nuclear Corporation of America, Denville, N.J., a corporation of Delaware Filed Aug. 22, 1956, Ser. No. 605,566

8 Claims. (Cl. 250—71)

This invention relates to apparatus for detecting and counting radioactivity, and more particularly to the discrimination and evaluation of radioactivity from a selected source to the exclusion of other sources.

For this purpose, so-called spectrometer apparatus has heretofore been employed. Such apparatus is operated on the principle that commonly used radioactive sources, such as the radioactive isotopes of gold, cobalt, iodine, etc., may be distinguished from each other by the energy levels at which the greatest incidence of gamma radiation is detected. The gamma radiation from a single source will be spread over a broad range of energy levels; however, when the incidence of such radiation is plotted against the energy level, certain peaks of incidence will appear prominently. Each of the radioactive isotopes in common use for medical purposes has one or more incidence peaks, which occur at energy levels generally distinguishable from the peak incidence eenergy levels of the other isotopes. Such curves for five such isotopes are plotted, superimposed, in Figure 1.

Measuring the energy of such gamma radiation in mevs (millions of electron volts) it will be found that radioactive iodine (I-131) displays a number of incidence peaks at extremely low energy levels, but its highest incidence peak is at .364 mevs., and a clearly defined lower incidence peak is found at .638 mevs. Radioactive chromium (Cr-51) shows a lesser spread of energy values; it has a sharply defined incidence peak at .320 mevs. Radioactive gold (Au-198) has an energy peak at .411 mevs. Radioactive cobalt (Co-60) has two prominent peaks, one at 1.17 mevs and one at 1.33 mevs; whereas radioactive sodium (Na-24) has two very widely separated prominent peaks, the first at 1.37 mevs. and the second at 2.75 mevs.

In a laboratory wherein these isotopes, or several of them, are used from time to time, traces of radioactivity of one or another of the sources are likely to be present, along with background radiation as from cosmic rays, etc. The pulse count of such undesired and background radioactivity can be minimized by utilizing a pulse amplitude (voltage) discriminator having a "channel" which accepts and passes to the count equipment pulses of a certain, limited, amplitude range only.

Using prior spectrometer apparatus, the operator searches or scans the "spectrum" of radioactivity from zero to, say, 3,000,000 electron volts, with a discriminator which accepts and passes to the count (or count rate) mechanism only those pulses whose voltage falls within such a "channel," the discriminator excluding the higher amplitude pulses as well as those whose voltage is less than the lower channel limits. Since the detection and counting of such radioactivity involves the employment of high gain amplification, it is customary for the operator to vary the position of the pulse amplitude discriminator so as to scan the range of activity (from 0 to 3,000,000 electron volts). Such a search of the spectrum will disclose peaks of incidence of activity, which can ordinarily be identified by a skillful operator as being derived from the particular source whose activity is to be measured. By scanning and searching until the appropriate peak is found, the operator can set his variable pulse amplitude discriminator at the incidence peak for the particular radioactive source.

Considering the overlap in the energies of radioactivity of the several commonly used sources, the closeness of the energy levels at which the incidence peaks are found, problems of calibration of the apparatus, departures from linearity of amplification due to scanning over too broad a range, taking mathematical account of the several variables, including the gain of amplification employed, and other factors, the operation of spectrometer scanning apparatus has required much training and experience.

A principal purpose of the present invention is to provide an improved spectrometer by which the peak incidence energy level of the radioactive source to be counted may be brought into co-incidence with the counting channel by a simple push-button switching operation, without searching the spectrum of energy levels to locate the incidence peak of the particular radioactive source, and without mathematical computation or comparison to a standard source.

An additional purpose is to minimize the background count by eliminating background pulses except those whose amplitude falls within such counting channel.

Another purpose is to provide apparatus utilizable by a less skilled operator in such a push-button manner but which in the hands of a more skilled operator can be used also to scan the pulse amplitude spectrum in a manner of operation similar to that heretofore known.

A further purpose of the present invention includes providing a method of operating spectrometer apparatus, including a detector of radiation, a pulse amplitude discriminator and pulse count mechanism, whereby the peak incidence energy levels characteristic of the several radioactive sources to be discriminated are located instantaneously.

Still further objects will be apparent from the description which follows.

Figure 1 is a graph of the incidence curves for gamma radiation of the five radioactive isotopes heretofore mentioned, superimposed upon each other. The incidence of radiation is plotted against energy in millions of electron volts. The superimposed curves together comprise the schematic representation of an incidence curve of an amplified signal from radiation wherein all five radioactive sources are simultaneously present, and for this representation, the lower abscissa, measured in pulse voltage, is shown with a fixed voltage counting channel.

Figure 2 represents the effect, on such signal of Figure 1, of reducing the gain of amplification to bring a different incidence peak to the voltage level of the fixed counting channel.

Figure 3 is a circuit diagram, partly in block form, illustrating a preferred embodiment of the present invention.

Treating the superimposed curves of Figure 1 as if they represented the incidence of pulses present in a signal derived from the five radioactive sources present simultaneously, an operator employing prior spectrometer apparatus would scan the signal for variations in count rate. This is done by raising and lowering the voltage level of such a counting channel. From changes in the count rate as the counting channel was raised or lowered, the operator notes incidence peaks, and then seeks to identify a particular peak with a particular radioactive source. Such apparatus, known as the Francis-Bell Spectrometer, is fully described in "Nucleonics," November 1955, vol. 13, No. 11, p. 82, and other publications.

Apparatus embodying the present invention, however, is set at the time of manufacture so that its comparable counting channel is fixed at a pre-selected voltage level, shown in Figures 1 and 2 as being approximately 36 volts. By push-button switching, the operator brings any chosen incidence peak, shown in Figure 1, to within the voltage level of the counting channel. In Figure 1 the .320 mev. peak for Cr–51 is shown in the counting channel; whereas in Figure 2 the 1.33 mev. peak for Co–60 is in the same fixed level counting channel.

Five push-button switches are employed for this purpose. The first of these fixes the gain so that the electrical pulses due to gamma radiation at the .320 mev. energy peak (which characterizes Cr–51) is brought to the counting channel level of 36 volts. It may therefore be marked ".320 mev." or simply "chromium." The second push-button switch is identified with the .364 mev. incidence peak which is characteristic of I–131 and may be appropriately marked; the third with the .411 mev. incidence peak which characterizes Au–198; the fourth with the 1.33 mev. peak for Co–60 (the 1.17 mev. peak might have been chosen instead); and the fifth, with the 2.75 mev. peak of Na–24.

The apparatus employed is shown in Figure 3. Current is supplied at a fairly high voltage (say 1000 volts) to the detector, and at a lower voltage (say 270 volts) to a pre-amplifier, first section amplifier, second section amplifier, pulse amplitude discriminator and count means.

The detector may be a conventional detector of gamma radiation, including a gamma crystal and a photomultiplier tube. Gamma rays cause the crystal to scintillate, resulting in the photo-cathode emitting electrons in quantity proportionate to the energy level of radiation. Positive step pulses from the tube are linearly amplified in the preamplifier and in the first section amplifier. The amplitude of pulses in the resulting signal can therefore be identified with the energy level in mevs. of the radiation which causes the pulses, provided the gain of amplification is known and the amplifier and pre-amplifier operate within linear ranges.

The function of the attenuator circuit, generally designated 10, is to scale the electrical signal linearly by a factor which will bring the pulses created at any selected energy level to a common intermediate amplitude prior to final amplification. Linearity of amplification, from such common intermediate amplitude to the counting channel level of 36 volts, is obtained with far greater certainty than if it was necessary to amplify linearly a broad range of pulse amplitudes.

For simplicity, the pulses caused by the radioactivity of Cr–51 may be taken as establishing the common intermediate amplitude level; and passed to the second section of the amplifier and there amplified to the 36 volt level of the counting channel. If it is desired to count the radiation at a higher energy level (for example, the 1.33 mev. peak for Co–60, as shown in Figure 2), the appropriate push-button switch of the attenuator circuit 10 introduces enough resistance into the circuit to scale the entire signal so that the stronger pulses, created at the higher energy level, will be reduced and established at the common intermediate amplitude.

The signal from the first section amplifier is introduced into the attenuator circuit 10, by means of a capacitor 11 and a zero setting potentiometer 12. Any portion of its 5 kilohm resistance necessary to adjust the over-all gain of amplification for deterioration or daily variation of components may be introduced in the circuit; and it is provided with an indicator whereby the over-all gain may be verified. The capacitor 11 is connected through the potentiometer 12 to one side of the attenuator circuit 10. The other side leads through a 180 ohm common circuit resistance 13, and thence to the second section amplifier.

To operate the attenuator circuit, eight circuit leads 10a to 10h inclusive are provided, each of which leads connects with one of the switch elements 14a to 14h of the first switch section (generally designated 14) consisting of a gang of eight double-pole switches. The second section thereof, generally designated 27, will be referred to hereinafter. The switch elements 14a to 14h are of the push-button type, the closing of any one element causing any other previously closed element to open.

The first circuit lead 10a and switch element 14a connect the potentiometer 12 and the common circuit resistance 13 without any intermediate resistance; and the sixth lead 10f do likewise. With either of these leads and switch elements in circuit, the stage of amplification of the signal is such that pulses derived from radiation at an energy level of .320 mevs. will have reached an amplitude which has been referred to as the common intermediate amplitude—that is, the amplitude which, when further amplified by the fixed gain of the second section amplifier, will reach but not exceed the counting channel fixed voltage level of approximately 36 volts.

The switch elements 14b, c, d and e selectively switch into the circuit pre-selected resistors 15, 18, 20, 22 and 24, and factory-set potentiometers 16, 17, 19, 21, 23 and 25, as shown in Figure 3. Such resistance elements are a reliable means for scaling down the signal linearly, proportionate to the resistance employed and inversely (that is, compensatingly) for the energy level of radiation to be located within the counting channel. Thus, switch element 14b directs the signal through lead 10b, putting in circuit enough resistance to scale the signal amplitude whereby to bring to the counting channel level the pulses associated with the .364 mev. peak for iodine; the switch element 14c and lead 10c function similarly for the .411 mev. peak for gold; switch element 14d and lead 10d, for the 1.33 mev. peak for cobalt; and the switch element 14e and lead 10e for the 2.75 mev. peak for sodium.

Switch element 14f connects lead 10f directly to lead 10a. It is used to establish a standard gain of amplification for operation of the apparatus by scanning, as hereinafter set forth. Switch element 14g puts into the circuit through lead 10g all the resistance elements 15, 16, 17, 18, and a factory pre-set portion of the 500 ohm potentiometer 19, to reduce said standard gain by one-half. Switch element 14h adds the remainder of the resistance of potentiometer 19, together with the resistance elements 20, 21, 22 and a factory pre-set portion of the resistance of the 500 ohm potentiometer 23, to reduce the gain further by two-thirds. The capacitor 11 is connected to ground through an additional 1000 ohm resistor 26 in series with the resistance elements 15 to 25 as shown.

The second section amplifier is of any familiar type that may give good linearity to signals including pulses up to say 100 volts amplitude; but the linearity is especially reliable and accurate for raising to the 36 volt level of the counting channel, pulses of the common intermediate amplitude level heretofore described.

The second switch section, generally designated 27, of the gang of eight double-pole switches, consists of eight switch elements 27a to 27h respectively, of push-button type similar to the switch elements 14a to 14h the individual elements thereof being ganged to operate with the operation of the corresponding switch elements of the first switch section 14. The five switch elements 27a to 27e are merely alternate connections to the fixed-channel side of the discriminator circuit, utilized when the apparatus is operated by the push-buttons at the fixed voltage discriminator channel. The elements 27f, g and h are alternate connections to the scanning potentiometer, hereinafter mentioned, utilized when the apparatus is employed for scanning at any one of the three fixed amplification levels controlled by the switch elements 14f, g and h with which they are respectively ganged. These set the energy range which may be scanned at .5 mev. 1 mev. and 3 mevs. respectively.

Operation of the apparatus by scanning, and the circuit details utilized, are similar to those of the Francis- Bell spectrometer. Any of the three switch elements 14f to 14h inclusive establishes a circuit to the second section amplifier. The signal from it is analyzed for pulses within a counting channel, which may be set at any voltage level from zero to 100 volts. As shown in Figure 3, the signal is scanned by means of a ten-turn helical potentiometer 28 of 100 kilohm resistance, connected at one of its ends to ground. The tap on the potentiometer determines the voltage by which signal input grids of two double vacuum tubes, used as discriminators, are biased. Only those signal pulses having a positive amplitude greater than such adjustable bias, may pass these grids.

The other end of the helical potentiometer 28 is connected through a zero-setting potentiometer 29 to assure accuracy of the bias voltage. Next in series is a 10 kilohm potentiometer 30 which sets the counting channel at any desired width up to ten volts. This is accomplished by biasing the control grid of one of the two double tubes at a predetermined level, and biasing the control grid of the other of said tubes at a greater voltage, adjusted by the potentiometer 30 at from one to ten volts. Pulses whose amplitude equals or exceeds the greater bias value are eliminated by an anti-coincidence circuit, as in the Francis-Bell spectrometer. The entire 10 kilohm resistance of potentiometer 30 is connected in series through a 220 kilohm resistor 31 to a positive 270 volt source. Other details concerning this portion of the circuitry may be obtained from literature concerning the Francis-Bell spectrometer hereinbefore referred to.

In the present invention, for operation at a fixed voltage level, without scanning, another lead is provided between the ground and the zero setting potentiometer 29, placed in circuit by any of the switch elements 27a to 27e inclusive. In this lead are inserted in series two fixed resistances, a 43 kilohm resistor 32 adjacent to the ground and a 75 kilohm resistor 33 adjacent the potentiometer 29. Between the two resistors 32, 33 is a fixed channel lead 34, placed in circuit by any one of the switch elements 27a to 27e inclusive. These resistors 32 and 33 serve, in place of the ten-turn potentiometer 28, to bias the input grids of the two double discriminator tubes, at a fixed discriminator level of about 36 volts. Assuming the potentiometer 32 is set to establish a "distance apart" of one volt, the counting channel will thus accept and pass to the count means only those pulses of from 36 volts to 37 volts amplitude. The "count means" may be any device adapted for the purpose, such as a count rate meter, an integral counter with timer, or both.

In the claims which follow, the term "voltage level" as applied to the discriminator refers to either the general level or to the voltage bias of the lower discriminator, without regard to the precise distance apart which the upper and lower discriminator voltage levels may be set.

In the embodiment described, a resistance attenuator circuit is employed for precisely proportioned steps in signal amplitude. Such an attenuator circuit is a "selective stepped gain-effecting means" as used in the claims. The claims also refer to the gain as being "scaled," either by such resistors or otherwise. Both the term "scaled" and the term "selective stepped gain-effecting means" are intended to apply also to an alternate embodiment, wherein there may be employed a detector, pre-amplifier, and a series of proportioned, fixed gain amplifiers whereby the signal amplitude is proportionately increased rather than decreased. Despite the relative complexity of such stepped, fixed gain amplifiers, they may afford certain advantages, such as a reduction of noise level. Using them, the 2.75 mev. energy level for Na-24 would be taken as a standard at which minimum gain would be used. Further stages of gain, in inverse proportion to the energy level of the particular incidence peak sought to be discriminated, would then be switched into the circuit.

Included in the present invention is a new method of using scintillation spectrometer apparatus in which the counting channel voltage level is fixed. The steps of the new method include creating an electrical signal comprised of pulses proportionate in amplitude to the radioactivity present at all energy levels and amplifying such signal linearly. The signal voltage is then subjected to a pre-selected gain (either by amplification or by scaling down), which gain bears an inverse ratio to that which the energy level of the incidence peak for a selected source bears to any fixed standard. The fixed standard, using the attenuator circuit of resistors herein shown, should be as low as the peak incidence energy level of the lowest-energy source to be discriminated. Alternately, using a series of stepped fixed-gain amplifiers, the standard should be the highest energy level peak to be discriminated. By so scaling the signal voltage up or down in such proportion, the amplitude of pulses created at any selected energy level is brought to a pre-selected common intermediate voltage level. It is then amplified by a fixed gain equal to the ratio which the fixed counting channel voltage level bears to the common intermediate voltage level. The pulses derived from activity at the chosen incidence peaks are then within the counting channel, and may be counted.

To the extent that the present invention involves the use of elements of apparatus heretofore known, it may be defined as a method of using scintillation spectrometer apparatus for discriminating one of several radioactive sources without searching the pulse height spectrum for incidence peaks of radioactivity. In the present method, the steps include the selection, as a standard energy level, of the level of the lowest incidence peak for several of the radioactive sources likely to be present in the environment; fixing amplification means at a rate of gain whereby linear amplification is obtained; and setting the pulse amplitude discriminator at a fixed voltage level whereby there will be accepted by the discriminator and passed to the count mechanism, the pulses which were created from radiation at the standard energy level, as amplified. In this method of operation, radioactive sources having higher characteristic energy levels are separately discriminated by establishing a proportionality between their peak incidence energy levels and the standard energy level, and scaling the gain compensatingly in advance of signal discrimination.

Although the application so far has referred to the gamma radiation of commonly utilized radioactive sources, the apparatus as a whole would be applicable for use with alpha or beta radiation, or that from other sources wherein the energy levels of such radiation may be readily discriminated.

Various changes in the apparatus and method herein described will occur to those familiar with the art. Accordingly this invention is not to be construed narrowly, but as fully coextensive with the scope of the claims which follow.

I claim:

1. Apparatus for selectively counting electrical pulses created by radioactivity at several selected energy levels corresponding to peak incidence for several selected radioactive sources, comprising a detector of radioactivity whereby electrical pulses are created in response to such radioactivity, the amplitude of such pulses varying with the energy of radiation, amplification means therefor, a pulse amplitude discriminator set at a fixed voltage level whereby to accept pulses, so amplified, created at some fixed energy level, the discriminator having lower and upper amplitude limits whereby a count channel is established, and selective stepped gain-effecting means cooperating with said amplification means and selectively switchable into the circuit in advance of the discriminator, whereby the discriminator may selectively accept the amplified pulses created at each of the several selected energy levels.

2. Apparatus as defined in claim 1, the amplification means being linear, the steps of the gain-effecting means being proportioned corresponding to the relation of each of such selected energy levels of radiation to said fixed energy level, whereby to scale to amplitudes within the counting channel the pulses created at any of such selected energy levels.

3. Apparatus for selectively counting electrical pulses created by radioactivity at several selected energy levels corresponding to peak incidence for several selected radioactive sources, comprising a detector of radioactivity whereby electrical pulses are created in response to such radioactivity, the amplitude of such pulses varying with the energy of radiation, first linear amplifications means therefor, selective stepped gain-effecting means, the steps thereof being proportioned corresponding to the linear relation of such selected energy levels, whereby the amplitude of pulses created at any one of the selected energy levels may be brought to a common intermediate level of amplitude, second linear amplification means whereby the pulses so created are amplified to a final fixed voltage level, and a pulse amplitude discriminator set at said final fixed voltage level and having lower and upper amplitude limits whereby a count channel is established.

4. Apparatus for selectively counting electrical pulses created by radioactivity at selected energy levels corresponding to peak incidence for several selected radioactive sources, comprising a detector of radioactivity whereby a signal including electrical pulses is created in response to such radioactivity, the amplitude of such pulses varying with the energy of radiation, linear amplification means therefor, a pulse amplitude discriminator set at a fixed voltage level corresponding to the voltage of pulses created at the lowest of such selected energy levels, the discriminator having lower and upper amplitude limits whereby a count channel is established, and pulse count mechanism responsive to the output of the discriminator, together with an attenuator circuit cooperating with said amplification means and including resistors proportioned corresponding to the relation to said lowest energy level of each of the higher selected energy levels, and switch means whereby said proportioned resistors may be selectively introduced into the circuit, thereby scaling down the signal voltage so that pulses created at a higher selected energy level may be brought within said counting channel.

5. A scintillation spectrometer whereby several preselected energy levels of radioactivity may be precisely located and measured independently, comprising a detector of radioactivity whereby a signal including electrical pulses is created in response to the radioactivity present at all energy levels, the amplitude of such pulses varying with the energy of radiation, a first pre-set fixed gain amplifier whereby such pulses are linearly amplified, resistors proportionate to the several energy levels so preselected, switch means whereby said resistors are selectively introduced in circuit, the signal voltage being thereby proportionately reduced whereby to establish at a common intermediate voltage level the pulses created in response to radioactivity at any chosen one of said preselected energy levels, a second pre-set fixed gain amplifier having linear characteristics as regards pulses at said common intermediate voltage level, a pulse amplitude discriminator having fixed lower and upper voltage limits adapted to accept the pulses so amplified from said common intermediate voltage level, and a count mechanism responsive to pulses so accepted.

6. Apparatus for counting electrical pulses created by radioactivity from one of several selected radioactive sources, the said counted pulses being derived from radioactivity at a high incidence energy level chosen for each source to distinguish it from the other sources, comprising a detector of radioactivity whereby electrical pulses are created responsive to such activity, the amplitude of such pulses varying with the energy of radiation, selective stepped gain-effective means proportioned in the same relation as the chosen energy levels, whereby the detector output may be selectively scaled linearly so as to shift the pulses derived at any selected one of said energy levels to within a common voltage range, a pulse amplitude discriminator in circuit therewith including lower and upper voltage delimiting means whereby a counting channel is established embracing said common voltage range, and pulse count means responsive to the output of the discriminator.

7. A scintillation spectrometer adapted for either pushbutton or scanning operation, comprising the apparatus defined in claim 6, together withe alternate potentiometer means whereby the said upper and lower discriminator voltage limits may be varied progressively to scan the spectrum of radiation energy levels.

8. Apparatus for measuring radioactivity of one of several selected radioactive sources by counting pulses derived at an energy level chosen for each source to distinguish it from the other sources, comprising a detector of radioactivity whereby electrical pulses are created, the amplitude of such pulses varying linearly with the energy of radiation, a fixed gain amplifier in circuit therewith, resistors proportionate to the several energy levels so chosen, together with switch means whereby said resistors may be selectively introduced in the circuit, thereby scaling the signal voltage so as to shift the pulses derived at any of such chosen energy levels to within a common voltage range, a pulse amplitude discriminator in circuit therewith, having lower and upper limits set to delimit the said common voltage range, and a pulse count mechanism responsive to the output of said discriminator.

References Cited in the file of this patent

UNITED STATES PATENTS

| | | |
|---|---|---|
| 2,648,012 | Scherbatskoy | Aug. 4, 1953 |
| 2,688,703 | Giovanni et al. | Sept. 7, 1954 |
| 2,709,759 | Davidon | May 31, 1955 |
| 2,750,513 | Robinson et al. | June 12, 1956 |